May 11, 1971  R. R. HUBER  3,578,467
VARIABLE VOLUME COFFEE CONTAINER
Filed Sept. 5, 1968
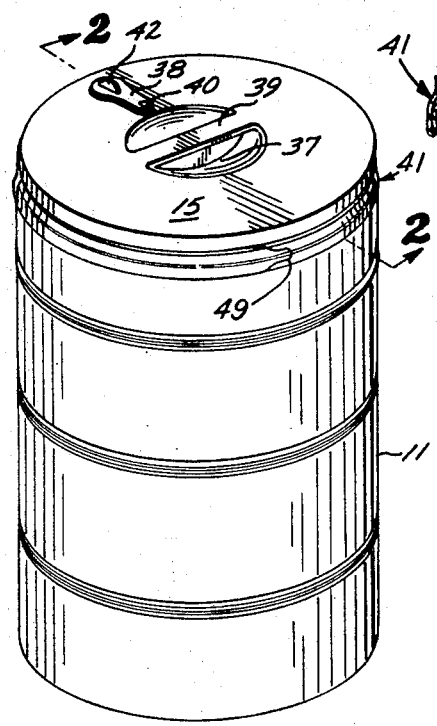
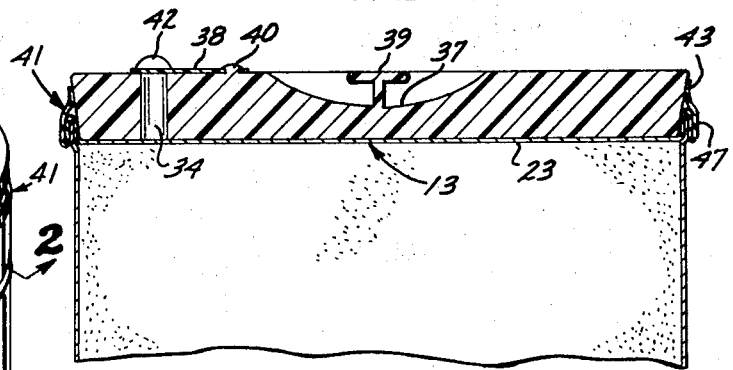
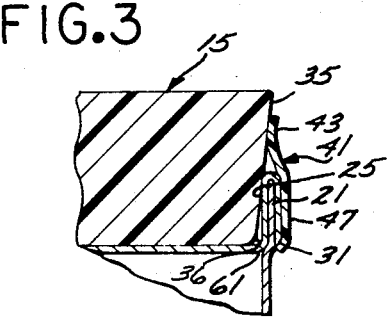
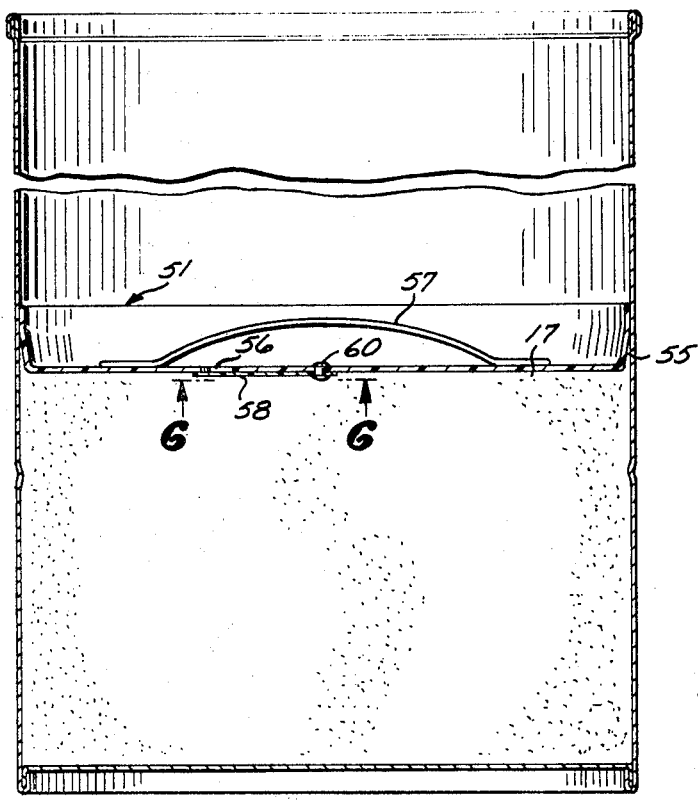
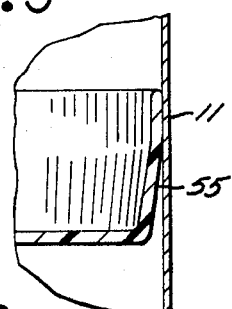
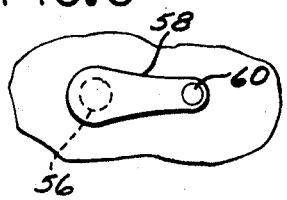
INVENTOR.
RICHARD R. HUBER
BY Fulwider, Patton, Rieber,
Lee and Utecht
ATTORNEYS United States Patent Office 3,578,467
Patented May 11, 1971

3,578,467
VARIABLE VOLUME COFFEE CONTAINER
Richard R. Huber, 853 Rincon Lane,
Palos Verdes Estates, Calif. 94306
Filed Sept. 5, 1968, Ser. No. 757,596
Int. Cl. B65b 25/00
U.S. Cl. 99—182    3 Claims

ABSTRACT OF THE DISCLOSURE

A coffee container apparatus including an open top can which receives a plunger type cover that closely fits the wall of the can and is insertable downwardly thereinto to force the air there out of to come to rest on the top of the coffee and hermetically seal air from contact therewith whereby the coffee aroma will be maintained. The cover may include an upwardly and outwardly flared, resilient, peripheral lip which deforms to conform to the can wall configuration for assuring positive hermetic sealing.

BACKGROUND OF THE INVENTION

Field of the invention

The present invention relates generally to containers for ground coffee and more particularly to variable volume coffee containers which may have their volumes progressively reduced as coffee is removed therefrom to prevent dilution of the coffee aroma by air trapped in the closed container during storage.

Description of prior art

Coffee containers have been proposed which include plastic covers for sealing the top of the coffee can, but such covers trap air within the upper portion of the can and such air absorbs the coffee aroma and acts as a vehicle to carry the aroma away when the cover is removed thereby leaving the remaining coffee rather bland.

SUMMARY OF THE INVENTION

The variable volume coffee container apparatus of present invention is characterized by an open top can which receives a plunger type cover. The cover fits the container snugly and may include a resilient peripheral lip for conforming to the can wall configuration to form a hermetic seal whereby the cover may be inserted within the can to force the air therefrom and come to rest on the upper surface of the coffee thereby forcing the air from the container and isolating the coffee from the surrounding air to preserve the coffee aroma.

The objects and advantages of the present invention will become apparent from consideration of the following description when taken in conjunction with the accompanying drawing.

DESCRIPTION OF THE DRAWING

FIG. 1 is a perspective view of a coffee container apparatus embodying the present invention;

FIG. 2 is a vertical sectional view, in enlarged scale, taken along the line 2—2 of FIG. 1;

FIG. 3 is a partial vertical sectional view, in enlarged scale, similar to FIG. 2;

FIG. 4 is a broken vertical sectional view of a second embodiment of the coffee can apparatus of present invention;

FIG. 5 is a partial vertical sectional view, in enlarged scale, similar to FIG. 4 and showing a sealing lip on the cover; and FIG. 6 is a horizontal sectional view taken along the line 6—6 of FIG. 4.

DESCRIPTION OF THE PREFERRED EMBODIMENT

The embodiment of the coffee can apparatus shown in FIG. 1 includes generally: a coffee can 11 having a top 13 which may be removed to gain access to the coffee 17. With the top 13 removed, a cover, generally designated 15, will fit snugly within the container 11 and cooperate therewith to form a hermetic seal whereby the cover may be pressed downwardly in the container 11 to force air there out of and bring the cover into position overlying the top surface of the remaining coffee 17 whereby such coffee will be sealed against introduction of air to hold the coffee aroma captive.

Referring to FIG. 3, the can 11 may include an outwardly pressed rim 21 formed by the upper extremity of its vertical wall and the top 13 may include an end closure 23. The end closure 23 includes an end seam formed by an upwardly turned peripheral portion 25 that is turned back on itself to form a portion 29 which projects downwardly along the outer surface of the rim 21 and is affixed thereto at 31.

The container 11 may be sold with the cover 15 stored on the top 13 and the cover itself may be made of plastic or other desirable material. The cover 15 is pliable and is frusto-conical in shape to form a downwardly and inwardly inclined peripheral sealing surface 35 which will provide for convenient insertion of such cover within the container 11. The lower edge of the peripheral surface 35 is rounded off at 36 to enable coffee to be squeezed between the cover and container 11 to act as an auxiliary seal.

The cover 15 includes a through vertical bore 34 and a seal 38 pivotally connected to the cover by a fastener 40 and formed with a finger grasp tab 42.

The cover 15 includes a central depression 37 formed with a horizontally extending handle 39 for being grasped in removing the cover.

As indicated above, the cover 15 may be stored on the top 13 while the container 11 is on the grocer's shelf and it may be conveniently held in position thereon by a peripheral retainer strip, generally designated 41, which is affixed at its upper extremity 43 to the peripheral surface 35 of the cover 15 and projects downwardly and turns inwardly to form a rim gripping portion 47. A projecting extremity of the retaining strip 41 defines a pull-tab 49 to be grasped in removing such strip.

The embodiment shown in FIGS. 4 and 5 is similar to that shown in FIGS. 1, 2, 3, except that the cover generally designated 51, is formed with a covering portion 53 having an upturned and outwardly flared resilient flange 55 which will be deformed to conform to the shape of the can 11.

The cover 51 also includes a through bore 56 covered on its lower end with a resilient seal 58 secured to the top by a fastener 60. An arcuate plastic strip forms a handle 57 which is secured to the cover 51 to form a convenient hand-grasp means.

In operation, the coffee can apparatus will be sold with the cover 15 held in position on the container top 13 by the retaining strip 41. When the container 11 is to be opened the purchaser will pull the pull-tab 49 to peel the retainer strip from the cover 15 thereby freeing such cover for removal from the top of the container 11. The container top 13 will then be removed by a conventional can opener which will cut the top 13 along a peripheral line 61 (FIG. 3) whereby the upturned portion 25 will be faired in with the wall of the can 11.

After the top 13 has been removed, the user will have access to the coffee 17 and when the container 11 is to be stored, remaining coffee will be covered by the cover 15. The seal 38 is pivoted to uncover the bore 34 and the cover 15 inserted within the container 11 and pressed downwardly to force air trapped therein upwardly through such bore and bring the cover to rest on the top surface of the remaining coffee 17. The seal 38 will then be pivoted into covering position over the bore 34 to seal the coffee 17 from exposure to air which would absorb its aroma and serve as a vehicle to carry such aroma away. Also, pressing of the cover 15 downwardly against the top of the coffee 17 will force granules of coffee upwardly around the rounded edge 36 (FIG. 3) to enhance its sealing characteristics. When the user desires access to more coffee the cover 15 may easily be removed by again pivoting the seal 38 to the side of the bore 34 and grasping the handle 39 to pull the top upwardly and out of the can 11.

The cover 51 shown in FIG. 4 is utilized in essentially the same manner as the cover shown in FIGS. 1 through 3 except that the upwardly turned and outwardly flared resilient flange 55 provides for substantial deformation to conform to the variations in configuration of coffee cans 11 resulting from the relatively loose tolerances of manufacture. When the cover 51 is inserted in the can 11 the air trapped thereunder will deform the flange 55 inwardly away from the wall of the can 11 to enable such air to escape upwardly thereby permitting the cover to be easily lowered in the can. When the cover 51 is removed from the can 11 a very slight partial vacuum will be created under the cover when it is pulled upwardly, thus causing the flap type seal 58 to flex downwardly and admit air through the bore 56 to permit such cover to be freely removed from the can 11.

From the foregoing description it will be apparent that the variable container apparatus of present invention is straightforward in design and economical to manufacture. The cover may be adapted for utilization with conventional coffee cans, thus avoiding the necessity of altering conventional manufacturing apparatus. Further, the container apparatus provides a convenient and effective means for sealing the aroma of coffee within its container to maintain such coffee fresh over prolonged periods of time and avoiding the long unsolved problem of rather bland tasting beverage which is produced by the last measures of coffee in a container.

Various modifications and changes may be made with regard to the foregoing detailed description without departing from the spirit of the invention.

I claim:
1. A variable volume coffee container comprising:
   a can filled with coffee and formed with a substantially constant cross section interior and including top and bottom end closures, said top end closure being openable;
   a separate cover shaped to define a plunger corresponding in shape to said cross section for telescopical receipt in said can and having its periphery formed to closely fit the vertical wall thereof to cooperate therewith and form a hermetic seal, said cover being formed with a through aperture;
   a handle mounted on said cover;
   an aperture seal for selectively sealing said aperture said seal being in the form of a resilient tab disposed on the underside of said cover and having one end affixed thereto and the opposite end projecting over said aperture whereby said tab will be pushed away from said aperture by means of the pressure differential created thereacross during removal of said cover to admit air under said cover; and
   retaining means removably securing said cover to said can with said top closure in place.

2. A variable volume coffee container as set forth in claim 1 wherein:
   said top end closure is formed with a double folded end seam sandwiching the upper extremity of the side wall of said can therein and forming an open top cavity at the top of said can;
   said cover is formed to be, at least, partially received in said cavity; and
   said retaining means is in the form of a retaining strip removably secured to said cover and normally gripping said end seam.

3. A variable volume container as set forth in claim 1 wherein:
   said cover includes an upwardly turned, outwardly angled peripheral resilient flange which cooperates with the wall of said can to form said hermetic seal and will flex away from said wall to provide for escape of air during insertion of said cover.

References Cited

UNITED STATES PATENTS

| 890,196 | 6/1908 | Surbrug | 220—93X |
| 1,484,195 | 2/1924 | Sexton | 220—29 |
| 2,172,457 | 9/1939 | Schwartz | 220—93 |
| 2,315,563 | 4/1943 | Taylor | 220—67X |
| 2,855,130 | 10/1958 | Hosler | (220—93UX) |
| 3,163,311 | 12/1964 | Stolk | 220—29X |
| 3,380,624 | 4/1968 | Lincoln et al. | 220—93 |
| 1,978,025 | 10/1934 | McCown | 220—93 |

NORMAN YUDKOFF, Primary Examiner

J. R. GARRETT, Assistant Examiner

U.S. Cl. X.R.

220—29, 44, 93; 99—165, 171